US012704884B2

(12) United States Patent
Wu

(10) Patent No.: US 12,704,884 B2
(45) Date of Patent: Aug. 11, 2026

(54) ELECTRONIC DEVICE AND METHOD OF OPERATION

(71) Applicant: Lenovo (Beijing) Limited, Beijing (CN)

(72) Inventor: Peng Wu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 307 days.

(21) Appl. No.: 18/530,383

(22) Filed: Dec. 6, 2023

(65) Prior Publication Data

US 2024/0219976 A1 Jul. 4, 2024

(30) Foreign Application Priority Data

Dec. 30, 2022 (CN) ......................... 202211739677.8

(51) Int. Cl.
*G06F 1/16* (2006.01)
*F16C 11/04* (2006.01)

(52) U.S. Cl.
CPC ............ *G06F 1/1681* (2013.01); *F16C 11/04* (2013.01)

(58) Field of Classification Search
None
See application file for complete search history.

(56) References Cited

U.S. PATENT DOCUMENTS 11,573,611 B2 * 2/2023 Channaiah ............ E05D 11/105
12,393,066 B2 * 8/2025 Robinson ............ G02F 1/13471
2025/0271910 A1 * 8/2025 Liu ...................... G06F 1/1681

FOREIGN PATENT DOCUMENTS

KR 20240168802 A * 12/2024 .......... H04M 1/0216
TW 202044962 A * 12/2020
TW M617297 U * 9/2021 .......... G06F 1/1681

* cited by examiner

*Primary Examiner* — Imani N Hayman
*Assistant Examiner* — Rashen E Morrison
(74) *Attorney, Agent, or Firm* — ANOVA LAW GROUP, PLLC

(57) ABSTRACT

An electronic device includes: a first body; a second body rotatably connected to the first body; a base fixed relative to the first body, a first track being formed on the base, and a first stopper being formed on the first track; and a fitting member, wherein, during rotation of the second body, the second body drives the fitting member to slide along the first track, when the second body rotates to a first preset angle, the fitting member contacts with the first stopper in a direction of rotation of the second body to restrict the rotation of the second body.

13 Claims, 9 Drawing Sheets

ELECTRONIC DEVICE AND METHOD OF OPERATION

CROSS-REFERENCE TO RELATED APPLICATION

This application claims priority to Chinese Patent Application No. 202211739677.8, filed on Dec. 30, 2022, and the entire content of which is incorporated herein by reference.

TECHNICAL FIELD

The present disclosure relates to the technical field of electronic device technology, and more particularly, to an electronic device and a method of operation.

BACKGROUND

In the related art, two relatively rotating parts of an electronic device, such as a display screen and a keyboard, cannot rotate relative to a certain angle and lock. In this way, it is easy for a user to accidentally flip the display screen when touching the display screen, making it more inconvenient to operate.

SUMMARY

One aspect of the present disclosure provides an electronic device. The electronic device includes: a first body; a second body rotatably connected to the first body; a base fixed relative to the first body, a first track being formed on the base, and a first stopper being formed on the first track; and a fitting member, wherein, during rotation of the second body, the second body drives the fitting member to slide along the first track, when the second body rotates to a first preset angle, the fitting member contacts with the first stopper in a direction of rotation of the second body to restrict the rotation of the second body.

Another aspect of the present disclosure provides a method of operating an electronic device including a first body and second body arranged opposite to each other. The method includes: in response to opening the second body relative to the first body, driving, by the second body, a fitting member to slide along a first track; and in response to the second body rotating to a first preset angle, driving, by the second body, in a direction of rotation of the second body, the fitting member to contact with a first stopper to restrict the rotation of the second body.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts and may be encompassed in the present disclosure.

REFERENCE NUMERALS

Figure 1:
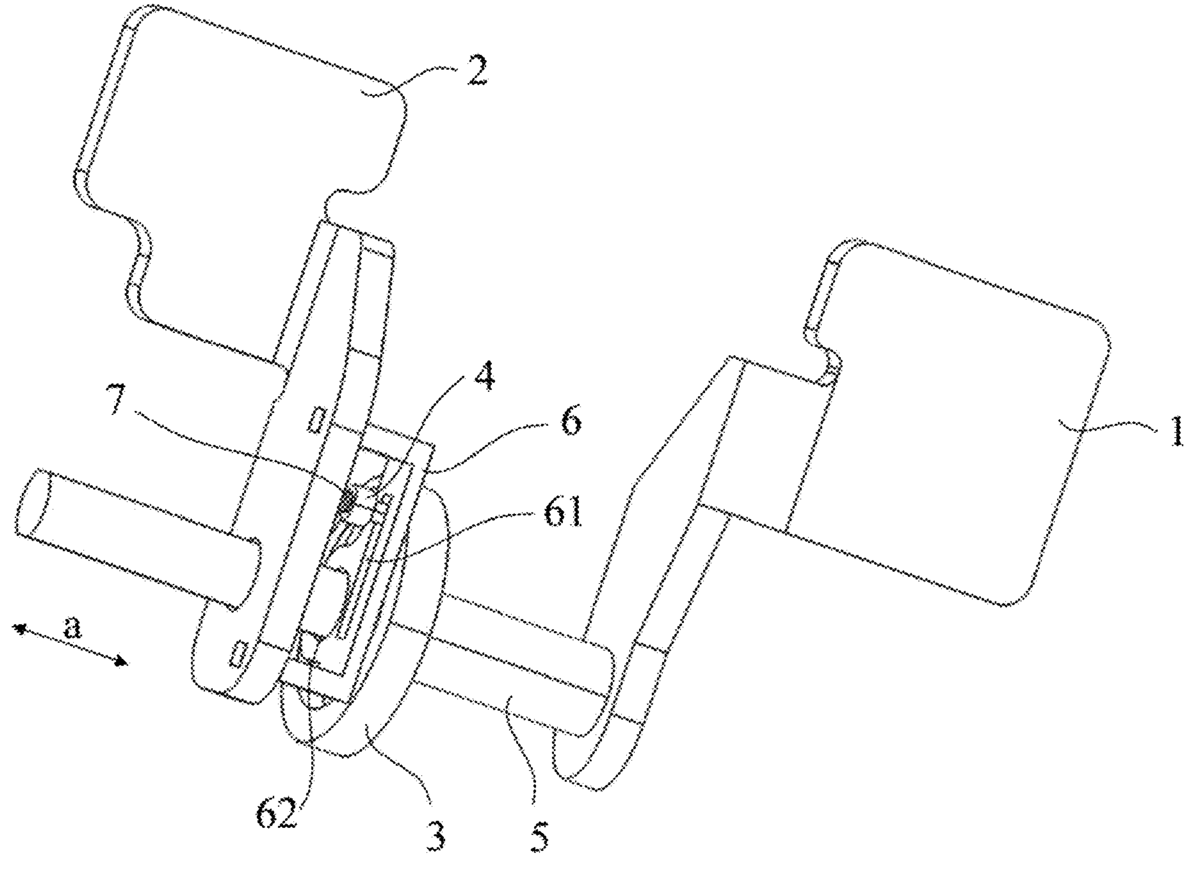
FIG. 1 is a schematic structural diagram of an exemplary electronic device from a first perspective according to some embodiments of the present disclosure.
Figure 2:
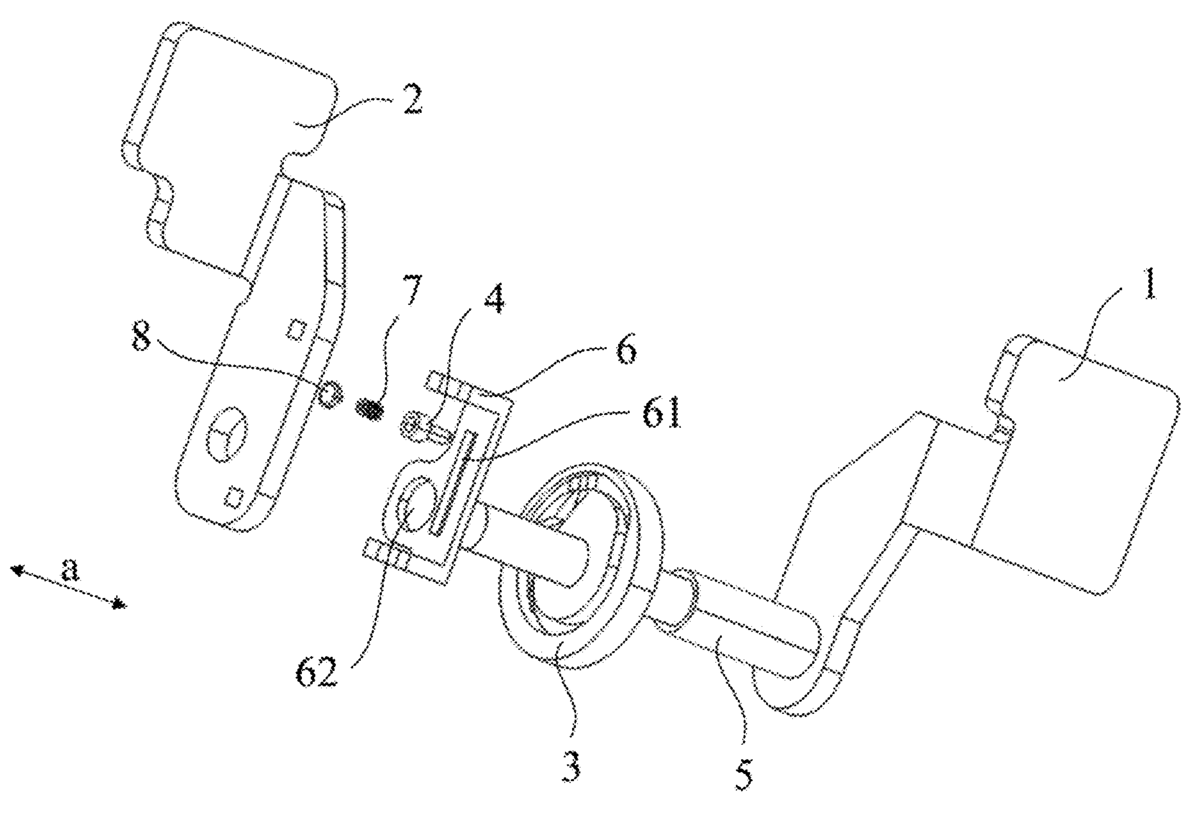
FIG. 2 is an exploded view of an exemplary electronic device according to some embodiments of the present disclosure.
Figure 3:
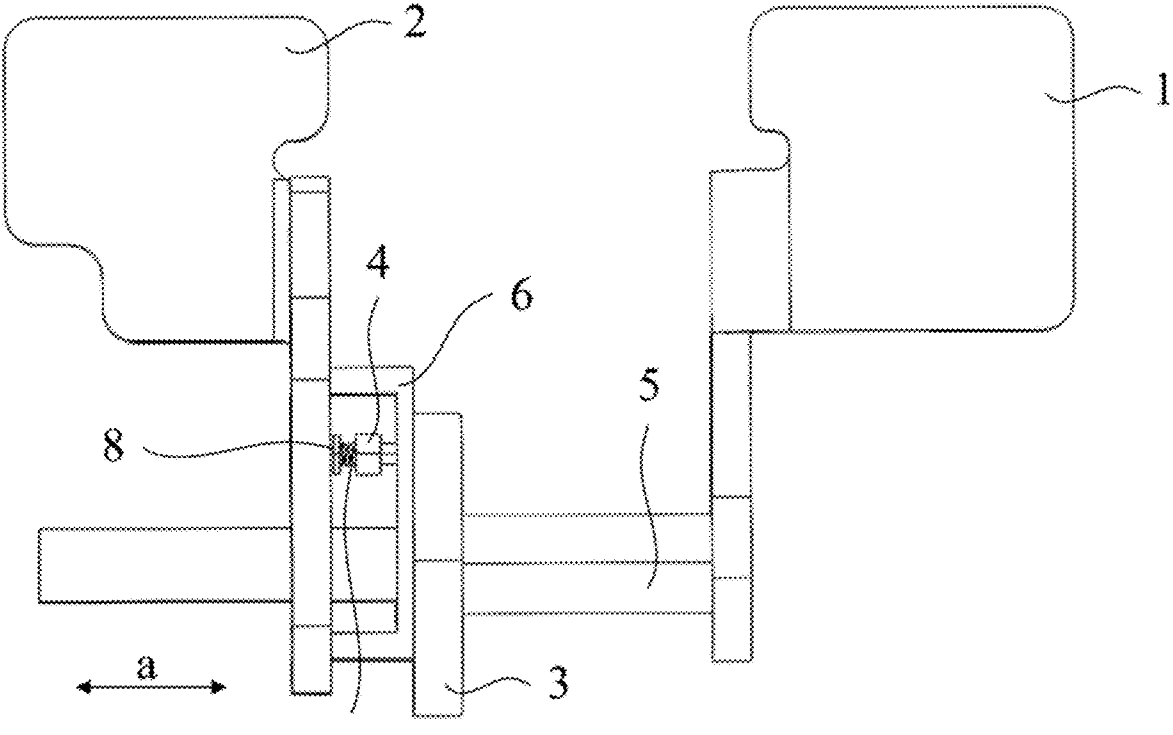
FIG. 3 is a schematic structural diagram of an exemplary electronic device from a second perspective according to some embodiments of the present disclosure.

1—first body; 2—second body; 3—base; 31—first track; 311—first stopper; 312—extension section; 313—first arc section; 314—second stopper; 32—second track; 321—initial section; 322—second arc section; 323—third arc section; 4—fitting member; 5—rotation shaft; 6—mounting member; 61—guiding through-hole; 62—mounting hole; 7—elastic member; 8—spring mounting member; a—first direction.

DETAILED DESCRIPTION OF THE EMBODIMENTS

It should be noted that, in absence of conflict, embodiments and technical features in the embodiments can be combined with each other. The detailed description in the embodiments of the present disclosure is intended to be illustrative and should not be regarded as limitation on the present disclosure.

In the embodiments of the present disclosure, terms such as “first” and “second” are only used for descriptive purposes and cannot be understood as indicating or implying relative importance or implicitly indicating the number of indicated technical features. Therefore, features defined as “first” and “second” may explicitly or implicitly include one or more of these features. In the description of the embodiments of the present disclosure, unless otherwise specified, “plurality” means two or more.

In addition, in the embodiments of the present disclosure, orientation terms such as “upper,” “lower,” “left,” and “right” are defined relative to orientations in which components in the drawings are schematically placed. It should be understood that these orientation terms are relative concepts and they are used for relative description and clarification, which may change accordingly according to changes in the orientation of the components in the drawings.

In the embodiments of the present disclosure, unless otherwise clearly stated and limited, the term “connection” should be understood in a broad sense. For example, “connection” may be a fixed connection, a detachable connection, or an integral body. It may be a direct connection or an indirect connection through an intermediary.

In the embodiments of the present disclosure, terms such as “comprising,” “including,” or any other variation thereof are intended to cover a non-exclusive inclusion, such that a process, method, article or apparatus that includes a list of elements not only includes those elements, but also includes other elements not expressly listed or elements inherent to the process, method, article or apparatus. Without further limitation, an element defined by the statement "comprises a . . . " does not exclude the presence of additional identical elements in a process, method, article or apparatus that includes that element.

In the embodiments of the present disclosure, terms such as "exemplarily" or "for example" are used to represent examples, illustrations, or explanations. Any embodiment or design described as "exemplary" or "for example" in the embodiments of the present disclosure shall not be construed as being preferred or advantageous over other embodiments or designs. Rather, the use of the terms "exemplarily" or "for example" is intended to present relevant concepts in a concrete manner.

The present disclosure provides an electronic device. The electronic device may be in various forms. For example, the electronic device may be a laptop computer, a mobile phone, or a smart wearable device, etc.

In some embodiments, referring to FIGS. 1 to 4, the electronic device includes a first body 1, a second body 2, a base 3, and a fitting member 4. The second body 2 is rotationally connected to the first body 1. The base 3 is fixed relative to the first body 1. A first track 31 is formed on the base 3. A first stopper 311 is provided on the first track 31. When the second body 2 is rotated, the second body 2 drives the fitting member 4 to slide along the first track 31. When the second body 2 rotates to a first preset angle, the fitting member 4 moves in in a direction of rotation of the second body 2 to contact with the first stopper 311 to limit the rotation of the second body 2. With such a structure, when the second body 2 rotates to the first preset angle, the fitting member 4 slides along the first track 31 to a position abutting the first stopper 311, such that the rotation of the second body 2 is stopped. In this way, the second body 2 can be rotated to a certain angle relative to the first body 1 and then locked. Even if the user touches the second body 2 with a substantial force, the second body 2 is unlikely to flip accidentally, thereby improving ease of operation of the electronic device.

In some embodiments, referring to FIGS. 1 to 4, the rotation of the second body 2 refers to the rotation of the second body 2 relative to the first body 1.

In some embodiments, referring to FIGS. 1 to 4, one of the first body 1 and the second body 2 is an input device, and the other is a display device. The display device and the input device are arranged opposite to each other. The display device and the input device may be in various forms. In some embodiments, the electronic device is a laptop computer, the display device is a display screen of the laptop computer, and the input device is a keyboard of the laptop computer. In some embodiments, the electronic device is a flip phone, the display device is a display screen of the flip phone, and the input device is a keyboard of the flip phone. In some embodiments, the electronic device is be a folding screen mobile phone, the display device is a folding part of the folding screen mobile phone screen, and the input device is another folding part of the folding screen mobile phone screen.

In some embodiments, referring to FIGS. 1-4, the base 3 may be fixed relative to the first body 1 in various forms. For example, the base 3 may be fixed relatively to the first body 1 through clamping, gluing, hot-melt connection, welding, fastener connection, or integral molding. In some embodiments, the electronic device further includes a rotation shaft 5. The first body 1 and the second body 2 are rotationally connected through the rotation shaft 5. An axis of relative rotation between the first body 1 and the second body 2 is an axis of the rotation shaft 5. The rotation shaft 5 and the first body 1 are fixed together. An insertion hole is formed in base 3. The rotation shaft 5 is inserted into the insertion hole along an axial direction. A radial cross-section of the insertion hole is different from a circle, to limit the relative rotation of the rotation shaft 5 and the insertion hole, thereby making the rotation shaft 5 and the base 3 relatively fixed, and the base 3 and the first body 1 relatively fixed.

Figure 4:
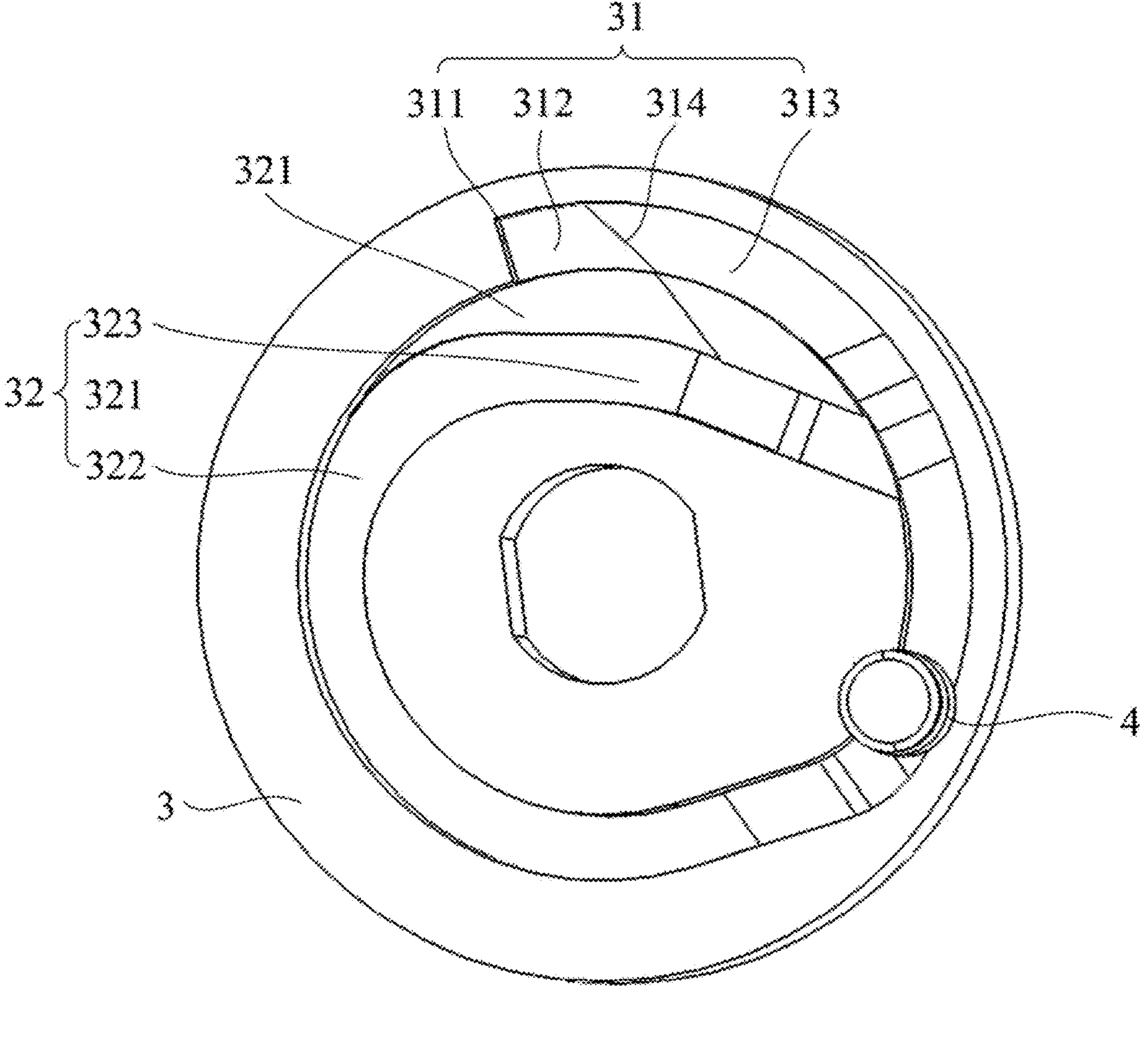
FIG. 4 is a schematic structural diagram of a fitting member located at a first arc section according to some embodiments of the present disclosure.
Figure 5:
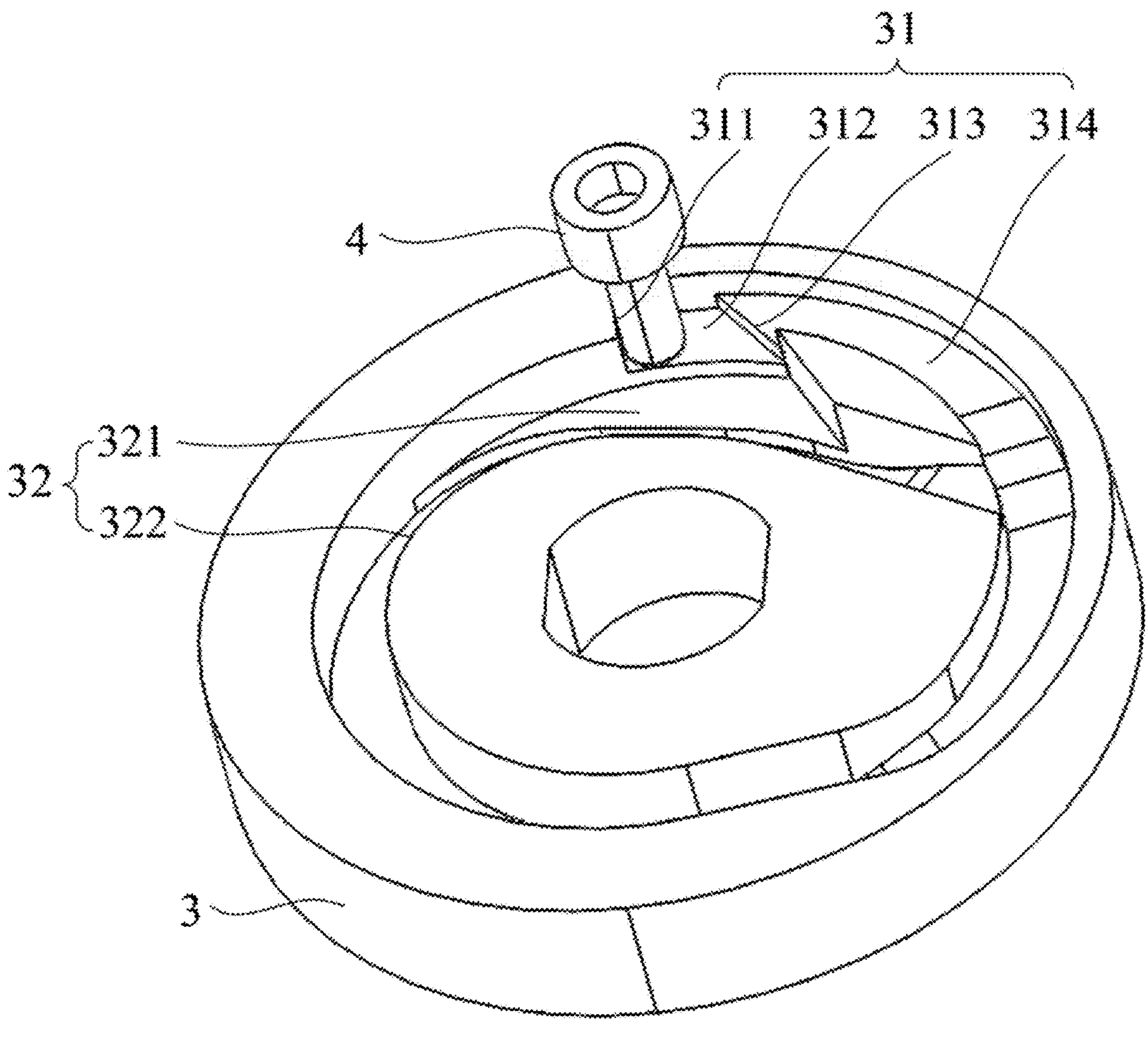
FIG. 5 is a schematic structural diagram of a fitting member being pushed against a first stopper according to some embodiments of the present disclosure.
Figure 6:
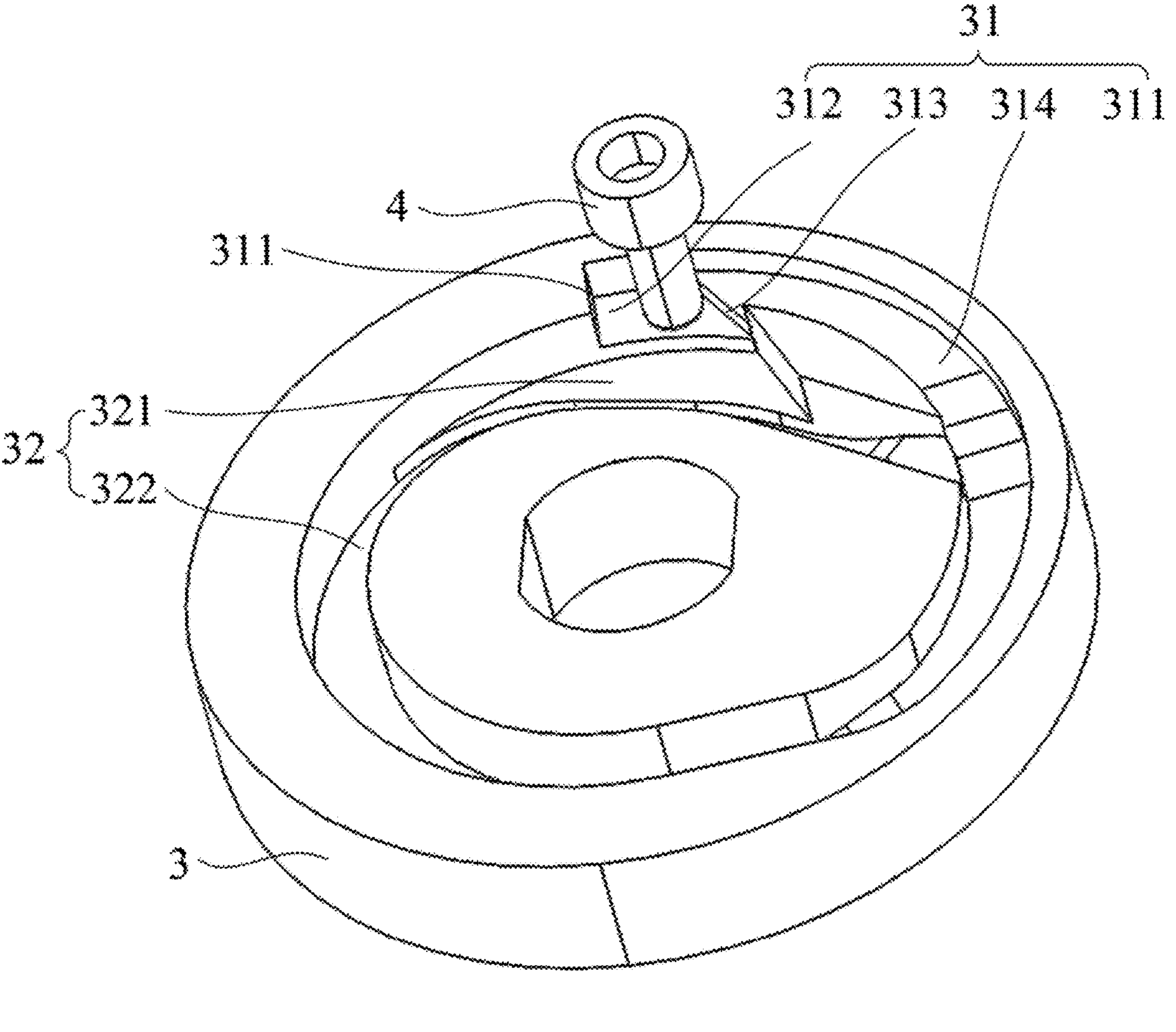
FIG. 6 is a schematic structural diagram of a fitting member being pushed against a second stopper according to some embodiments of the present disclosure.

In some embodiments, referring to FIGS. 4, 5 and 6, the first track 31 includes a first arc section 313 and an extension section 312. The first arc section 313 and the extension section 312 have a first height difference. The first stopper 311 is provided on a side of the extension section 312 away from the first arc section 313. A first direction a has a parallel relationship with the axis of rotation of the second body 2. When the fitting member 4 slides along the first track 31, the fitting member 4 contacts with the first track 31 along the first direction a. In this structure, during the rotation of the first body 1, the fitting member 4 slides from the first arc section 313 into the extension section 312, and then contacts with the first stopper located at an end of the extension section 312 away from the first arc section 313, thereby restricting the rotation of the second body 2. It can be understood that along the direction of rotation of the second body 2, the first stopper 311 is located at one end of the extension section 312, and the first arc section 313 is located at the other end of the extension section 312.

In some embodiments, referring to FIGS. 4, 5, and 6, a second stopper 314 is formed on a side of the extension section 312 adjacent to the first arc section 313. When the second body 2 is rotated by a first angle from the first preset angle, the fitting member 4 contacts with the second stopper 314, such that the fitting member 4 breaks away from the extension section 312 and enters a second track 32. In this structure, the contact between the fitting member 4 and the second stopper 314 causes the fitting member 4 to break away from the extension section 312, thereby causing the fitting member 4 and the first stopper 311 to be staggered along the direction of rotation of the second body 2. Thus, the first stopper 311 will not hinder the rotation of the second body 2, such that the second body 2 can continue to rotate. In this way, the second body 2 rotates to the first preset angle and gets locked, and continues to rotate beyond the first preset angle after being rotated back by a certain angle. Thus, the second body 2 can have a substantially large rotation range.

The first preset angle here may be in a range between 110 degrees and 130 degrees, and the user can use the display conveniently at the first preset angle. Of course, the first preset angle can be determined based on regular user operation habits.

In some embodiments, referring to FIGS. 4, 5, and 6, the first arc section 313 and the extension section 312 have the first height difference along the first direction a. When the fitting member 4 slides along the first arc section 313 slides to the extension section 312, it will move along the first direction a to be lower than the first arc section 313. In this way, when the second body 2 rotates back from the first preset angle by the first angle, the fitting member 4 will contact the second stopper 314 to break away from the extension section 312 and enter the second track 32. In some embodiments, the first track 31 and the second track 32 are arranged in a radial direction of the rotation shaft 5 of the second body 2. In some embodiments, the second track 32 is located on a side of the first track 31 adjacent to the rotation shaft 5 of the second body 2.

In some embodiments, referring to FIGS. 4, 5, and 6, the fitting member 4 and the second body 2 can slide relative to each other. A direction of the relative sliding between the fitting member 4 and the second body 2 is different from the direction of rotation of the second body 2. As such, when the fitting member 4 contacts with the second stopper 314, the fitting member 4 can slide along the second stopper 314 to break away from the extension section 312 and enter the second track 32. In this structure, the fitting member 4 can be separated from the extension section 312 more easily, and a manufacturing cost thereof is lower.

In some embodiments, referring to FIGS. 1-4, the electronic device also includes a mounting member 6 and an elastic member 7. The mounting member 6 is fixed relative to the second body 2. A guiding through-hole 61 is formed on the mounting member 6. The guiding through-hole 61 penetrates the mounting member 6 along the first direction a. The fitting member 4 is inserted into the guiding through-hole 61 to be able to slide relative to the second body 2. The second body 2, the mounting member 6, and the base 3 are arranged along the first direction a. The mounting member 6 is located between the second body 2 and the base 3. The electronic device also includes the elastic member 7. The elastic member 7 is supported between the second body 2 and the fitting member 4 along the first direction a to exert a constant force on the fitting member 4 towards the base 3. In this structure, it is more convenient to install the fitting member 4 on the second body 2. The elastic member 7 exerts the constant force on the fitting member 4 along the first direction a, such that when the fitting member 4 slides along the first track 31, it can enter the extension section 312 from the first arc section 313 through the first height difference.

In some embodiments, referring to FIGS. 1-4, the electronic device further includes a spring mounting member 8. One end of the spring mounting member 8 contacts with the second body 2 along the first direction a, and the other end is inserted into the fitting member 4 along the first direction a. The elastic member 7 is a compression spring. The compression spring extends along the first direction a. The compression spring is sleeved on the spring mounting member 8 along the first direction a, and its two ends contact with the spring mounting member 8 and the fitting member 4, respectively. In this structure, the elastic member 7 is installed stably and reliably.

In some embodiments, referring to FIGS. 1-4, a mounting hole 62 is formed on the mounting member 6. The rotation shaft 5 is axially penetrated through the mounting hole 62 to be rotationally connected to the mounting member 6. This structural form is more compact.

Figure 7:
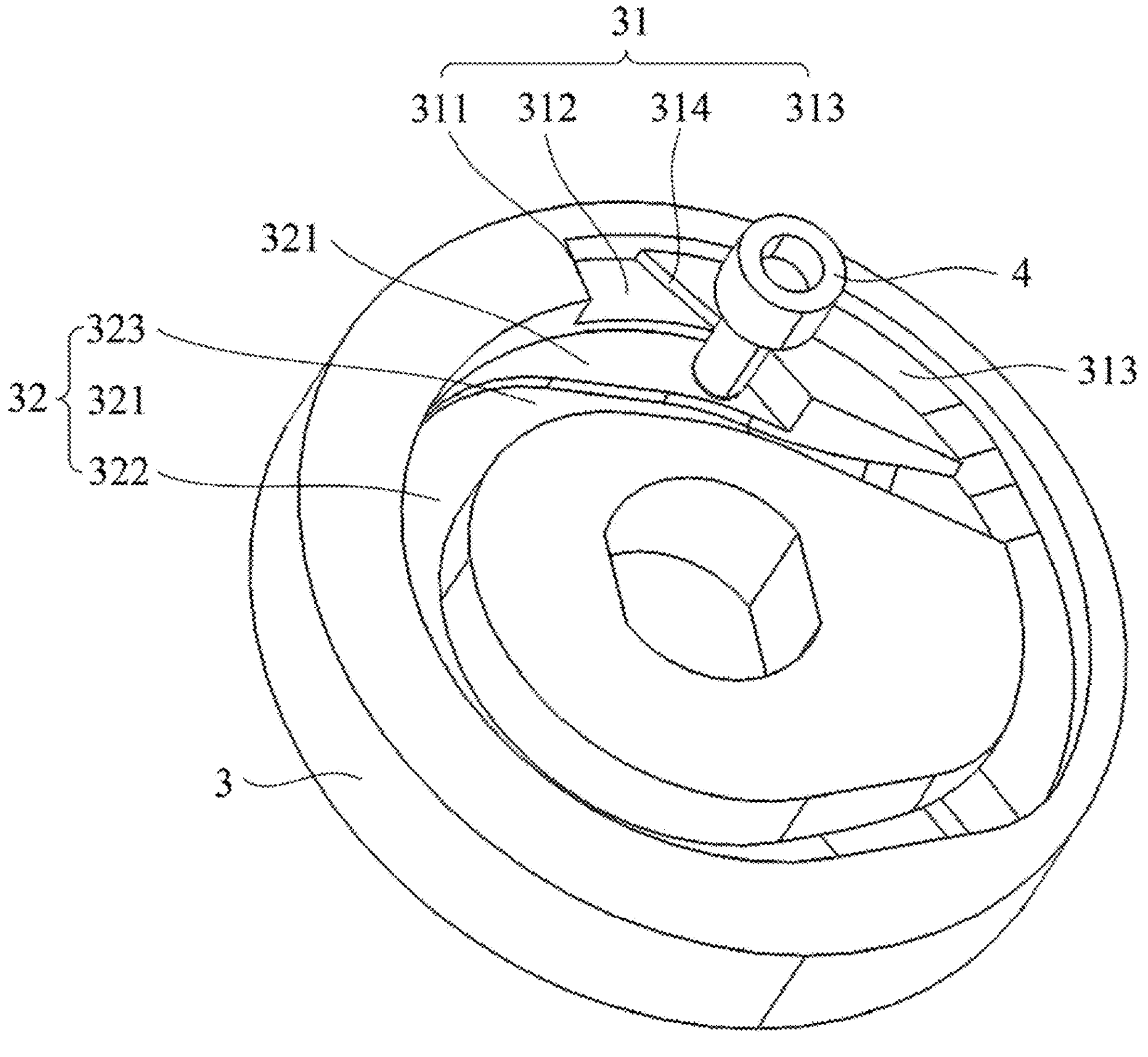
FIG. 7 is a schematic structural diagram of a fitting member located at a first position of an initial section according to some embodiments of the present disclosure.
Figure 8:
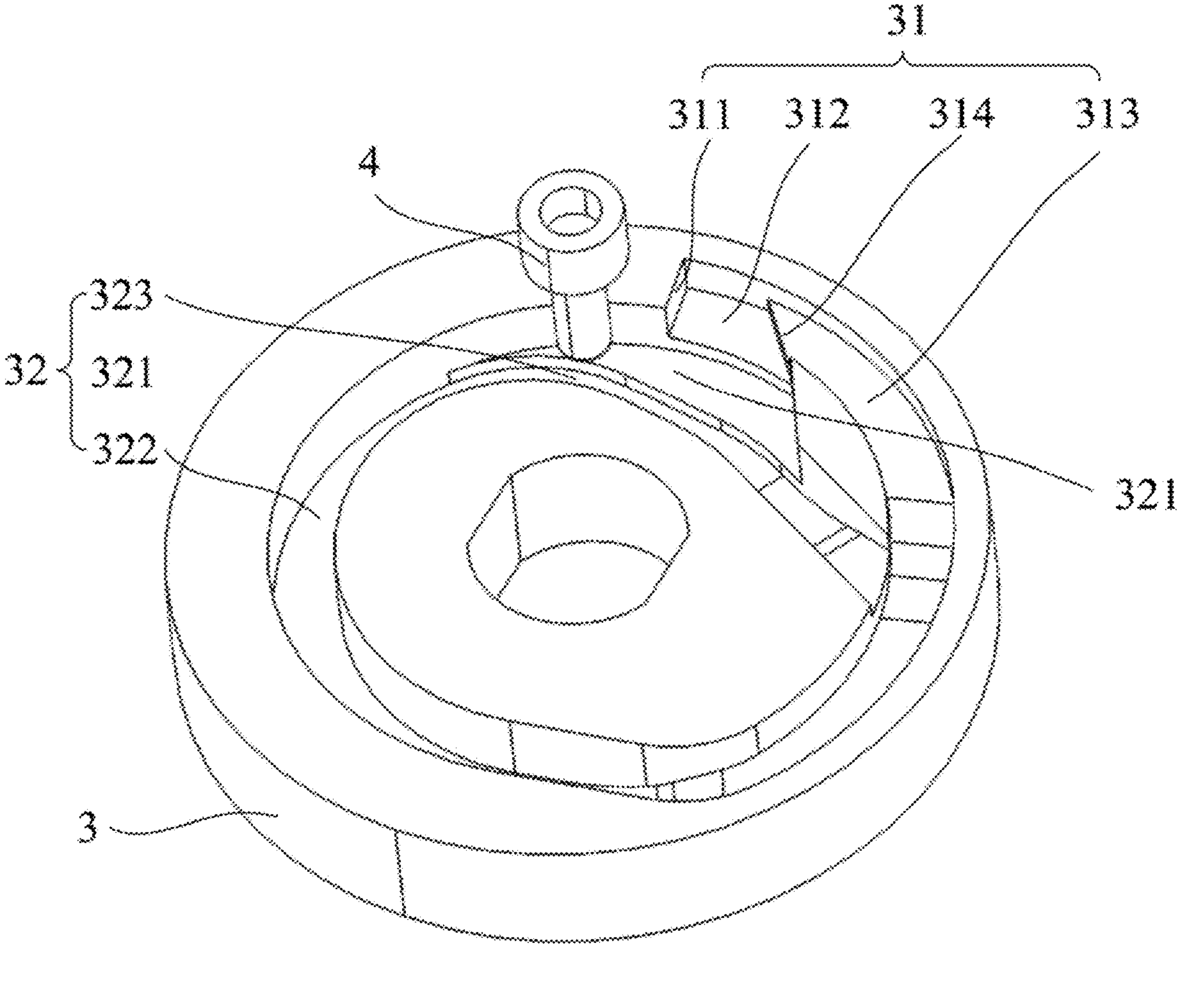
FIG. 8 is a schematic structural diagram of a fitting member located at a third arc section according to some embodiments of the present disclosure.

In some embodiments, referring to FIG. 7 and FIG. 8, along the direction of rotation of the second body 2, one end of the second track 32 extends to an end of the first arc section 313 away from the extension section 312. As such, during the rotation of the second body 2, the second body 2 drives the fitting member 4 to slide along the second track 32 to the first arc section 313. In this structure, when the fitting member 4 is located in the second track 32, the rotation of the second body 2 can cause the fitting member 4 to slide along the second track 32 into the first arc section 313, such that the fitting member 4 can slide along the first track 31 again. In this way, the fitting member 4 can cyclically slide on the first track 31 and the second track 32.

In some embodiments, referring to FIG. 7 and FIG. 8, the second track 32 is formed on the base 3. The second track 32 includes an initial section 321 and a second arc section 322. The initial section 321 and the extended section 312 have a second height difference in the first direction a. With the second height difference, the fitting member 4 breaks away from the extension section 312 and enters the second track 32. The second body 2 can drive the fitting member 4 to slide along the second track 32 by a second angle. In this structure, the fitting member 4 can break away from the extension section 312 and enter the second track 32 with the help of the second height difference. Moreover, due to the presence of the second height difference, it is not easy for the fitting member 4 to inadvertently move from the second track 32 back to the first track 31 during the rotation of the second body 2. This is beneficial to making the rotation of the second body 2 smoother. It can be understood that with the help of the second height difference, the fitting member 4 breaks away from the extension section 312 and enters the second track 32. That is, the fitting member 4 is subject to the constant force and has a tendency to move in the first direction a, such that the second height difference helps the fitting member 4 to break away from the extension section 312 and enter the second track 32. The constant force may be a gravity force or an elastic force of a spring, etc. In some embodiments, the second angle may be in various forms. In one example, the second angle may be an angle greater than 180 degrees. In another example, the second angle may be 360 degrees. In this way, the rotation of the second body 2 has a large range.

In some embodiments, referring to FIG. 7 and FIG. 8, the initial section 321 is provided with a second extension section (not shown) along the direction of rotation of the second body 2. The second extension section has a structure similar to a groove structure of the extension section 312 on the first track 31. A third stopper and a fourth stopper (not shown) are formed at both ends of the second extension section. When the second body 2 enters the second track 32 from the first track 31, the second body 2 continues to move away from the first body 1 along the direction of rotation. The fitting member 4 is driven by the second body 2 and slides along the initial section 321. When the second body 2 is extended to a second preset angle, the third stopper contacts with the fitting member 4 to restrict the rotation of the second body 2. The second preset angle is greater than the first preset angle. The fourth stopper is used to contact with the fitting member 4 during the rotation of the second body 2, such that the fitting member 4 can break away from the initial section 321 and enter a third track. In this structure, the third stopper limits the rotation of the second body 2 when the second body 2 is extended to the second preset angle, such that during the rotation of the second body 2, the third stopper and the first stopper 311 together facilitate multi-level locking of an unfolding angle of the second body 2. The fourth stopper is used to contact with fitting member 4 during the rotation of the second body 2, such that the fitting member 4 can break away from the initial section 321, thereby staggering the fitting member 4 and the third stopper, such that the second body 2 can continue to rotate passing the third stopper during the rotation process.

In the embodiments of the present disclosure, the multi-level locking satisfies user's needs for different unfolding angles and improves the user experience. For example, sometimes or some users are used to using their electronic devices at 120 degrees, and sometimes or some users are used to using their electronic devices at 140 degrees.

Figure 9:
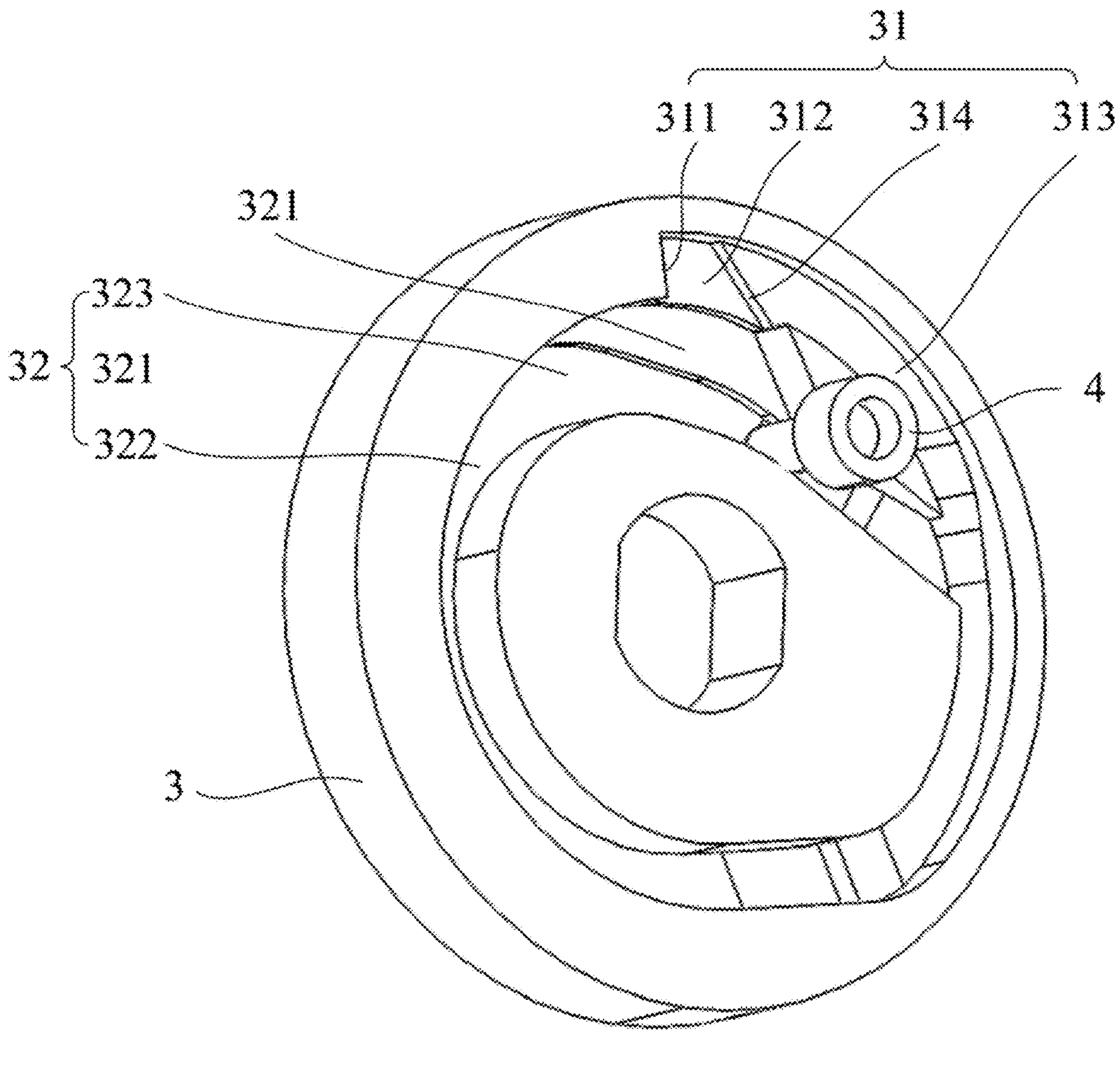
FIG. 9 is a schematic structural diagram of a fitting member located at a first position of an initial section according to some embodiments of the present disclosure.

In some embodiments, referring to FIG. 7, FIG. 8, and FIG. 9, a third arc section 323 is formed on a side of the initial section 321 on the second track 32 away from the extension section 312. The initial section 321 and the third arc section 323 have a third height difference in the first direction a. The third arc section 323 is connected to the second arc section 322. The second arc section 322 and the third arc section 323 form a part of the third track. The body 2 can drive the fitting member 4 to slide along the third track to contact with the first body 1. In this structure, during the rotation of the second body 2, the second body 2 can enter the third arc section 323 from the initial section 321 through the third height difference. Moreover, due to the presence of the third height difference, during the rotation of the second body 2, it is unlikely for the fitting member 4 to move from the third arc section 323 back to the initial section 321. This makes the rotation of the second body 2 smoother. In some embodiments, the extension section 312, the initial section 321, and the third arc section 323 are arranged radially in sequence along a rotation axis of the second body 2. In this structure, during the rotation of the second body 2, the fitting member 4 can sequentially enter the initial section 321 from the extension section 312, and enter the third arc section 323 from the initial section 321 under the assistance of the second height difference and the third height difference.

In some embodiments, referring to FIG. 7, FIG. 8, and FIG. 9, the initial section 321 and the second arc section 322 have a fourth height difference in the first direction a where they are connected. When the second body 2 is opened relative to the first body 1, the fitting member 4 enters the second arc section 322 from the initial section 321. When the second body 2 is closed relative to the first body 1, the fourth height difference restricts the fitting member 4 to move from the second arc section 322 back to the initial section 321. In this structure, during the rotation of the second body 2, the fitting member 4 enters the second arc section 322 from the initial section 321 under the assistance of the fourth height difference, and the fourth height difference restricts the fitting member 4 to move from the second arc section 322 back to the initial section 321, which is beneficial to the smooth rotation of the second body 2.

In some embodiments, referring to FIG. 7, FIG. 8, and FIG. 9, along the direction of rotation of the second body 2, one end of the third arc section 323 extends to an end of the first arc section 313 away from the extension section 312. Thus, during the rotation of the second body 2, the second body 2 can drive the fitting member 4 to slide along the third arc section 323 to the first arc section 313. In this structure, when the fitting member 4 is located in the third arc section 323, the rotation of the second body 2 can cause the fitting member 4 to slide along the third arc section 323 to the first arc section 313, such that the fitting member 4 can slide along the first track 31 again. In this way, the fitting member 4 can perform circular movement within the first track 31, the second track 32, and the third track.

The present disclosure also provides a method of operation to be applied to the disclosed electronic device. Referring to FIGS. 1-4, the method of operation includes the following processes. During an unfolding process of the second body 2 relative to the first body 1, the second body 2 can drive the fitting member 4 to slide along the first track 31. When the second body 2 rotates to the first preset angle, the fitting member 4 contacts with the first stopper 311 along the direction of rotation of the second body 2 to restrict the rotation of the second body 2. In this way, the second body 2 can be rotated to a certain angle relative to the first body 1 and then be locked. Even if the user touches the second body 2 with a substantial force, the second body 2 is not prone to accidental flipping. Thus, the ease of operation of the electronic device is improved.

In some embodiments, when the second body rotates back from the first preset angle by a first angle, the second body drives the fitting member to contact with the second stopper, such that the fitting member enters the second track to facilitate the second body to continue to rotate relative to the first body.

In some embodiments, when the second body continues to rotate to a second preset angle, the second body drives, in the direction of rotation of the second body, the fitting member to contact with the third stopper to restrict the rotation of the second body. The second preset angle is greater than the first preset angle.

In some embodiments, when the second body rotates back from the second preset angle by a second angle, the second body drives the fitting member to contact with the fourth stopper, such that the fitting member enters the third track to facilitate the second body to continue to rotate relative to the first body.

In some embodiments, when the second body continues to rotate, the second body drives, in the direction of rotation of the second body, the fitting member to contact with the first body.

The above are only some embodiments of the present disclosure, and are not intended to limit the scope of the present disclosure. Any equivalent structure or equivalent process transformation made using the contents of the description and drawings of the present disclosure may be directly or indirectly used in other related technical fields, and are all equally included in the protection scope of the present disclosure.

What is claimed is:

1. An electronic device, comprising:

a first body;

a second body rotatably connected to the first body;

a base fixed relative to the first body, a first track being formed on the base, and a first stopper being formed on the first track, wherein: the first track includes a first arc section and an extension section, and the extension section connects the first arc section along the direction of extension of the first track; and a fitting member, wherein, during rotation of the second body, the second body drives the fitting member to slide along the first track, when the second body rotates to a first preset angle, the fitting member contacts with the first stopper in a direction of rotation of the second body to restrict the rotation of the second body.

2. The electronic device according to claim 1, wherein:

one of the first body and the second body is an input device, the other is a display device, and the display device and the input device are arranged opposite to each other.

3. The electronic device according to claim 1, wherein:

the first arc section and the extension section have a first height difference along a first direction;

the first stopper is disposed at a side of the extension section away from the first arc section;

the first direction and an axis of rotation of the second body have a parallel relationship; and when the fitting member slides along the first track, the fitting member contacts with the first track along the first direction.

4. The electronic device according to claim 3, further comprising a mounting member and an elastic member, wherein:

the mounting member is fixed relative to the second body;

a guiding through-hole is formed on the mounting member, penetrating the mounting member in the first direction;

the fitting member is inserted in the guiding through-hole to slide relative to the second body;

the second body, the mounting member, and the base are arranged along the first direction;

the mounting member is located between the second body and the base; and the elastic member is supported between the second body and the fitting member along the first direction to exert a constant force on the fitting member towards the base.

5. An electronic device, comprising:

a first body;

a second body rotatably connected to the first body;

a base fixed relative to the first body, a first track being formed on the base, and a first stopper being formed on the first track; and a fitting member, wherein, during rotation of the second body, the second body drives the fitting member to slide along the first track, when the second body rotates to a first preset angle, the fitting member contacts with the first stopper in a direction of rotation of the second body to restrict the rotation of the second body, wherein:

the first track includes a first arc section and an extension section;

the first arc section and the extension section have a first height difference along a first direction;

a second stopper is formed at a side of the extension section adjacent to the first arc section; and when the second body rotates back from the first preset angle by a first angle, the fitting member contacts with the second stopper, such that the fitting member breaks away from the extension section and enters a second track.

6. The electronic device according to claim 5, wherein:

the second track is formed on the base;

the second track includes an initial section and a second arc section;

the initial section and the extension section have a second height difference in the first direction;

with the assistance of the second height difference, the fitting member breaks away from the extension section and enters the second track; and the second body drives the fitting member to slide along the second track to a second angle.

7. The electronic device according to claim 6, wherein:

a third arc section is formed on a side of the initial section away from the extension section;

the initial section and the third arc section have a third height difference along the first direction;

the third arc section is connected to the second arc section;

the second arc section and the third arc section form a part of a third track; and the second body drives the fitting member to slide along the third track to contact with the first body.

8. The electronic device according to claim 6, wherein:

the initial section and the second arc section have a fourth height difference along the first direction;

when the second body is opened relative to the first body, the fitting member enters the second arc section from the initial section;

when the second body is closed relative to the first body, the fourth height difference restricts the fitting member to move from the second arc section back to the initial section.

9. The electronic device according to claim 6, wherein:

the extension section, the initial section, and the third arc section are sequentially arranged radially along a rotation axis of the second body.

10. A method of operating an electronic device including a first body and second body arranged opposite each other, comprising:

in response to opening the second body relative to the first body, driving, by the second body, a fitting member to slide along a first track;

in response to the second body rotating to a first preset angle, driving, by the second body, in a direction of rotation of the second body, the fitting member to contact with a first stopper to restrict the rotation of the second body; and in response to the second body rotating back from the first preset angle by a first angle, driving, by the second body, the fitting member to contact with a second stopper, such that the fitting member enters a second track to facilitate the second body to continue to rotate relative to the first body.

11. The method according to claim 10, further comprising:

in response to the second body continuing to rotate to a second preset angle, driving, by the second body, in the direction of rotation of the second body, the fitting member to contact with a third stopper to restrict the rotation of the second body, the second preset angle being greater than the first preset angle.

12. The method according to claim 11, further comprising:

in response to the second body rotating back from the second preset angle by a second angle, driving, by the second body, the fitting member to contact with a fourth stopper, such that the fitting member enters a third track to facilitate the second body to continue to rotate relative to the first body.

13. The method according to claim 12, further comprising:

in response to the second body continuing to rotate, driving, by the second body, in the direction of rotation of the second body, the fitting member to contact with the first body.

* * * * *